April 30, 1940.  G. CONWAY  2,198,906

ANTISKID DEVICE

Filed June 20, 1939

INVENTOR.
Gilbert Conway,
Archworth Martin,
ATTORNEY.

Patented Apr. 30, 1940

2,198,906

UNITED STATES PATENT OFFICE 2,198,906

ANTISKID DEVICE

Gilbert Conway, Bellevue, Pa.

Application June 20, 1939, Serial No. 280,098

3 Claims. (Cl. 152—216)

One object of my invention is to provide an antiskid device which can more easily be applied to vehicle tires than can various forms of tire chains and other antiskid devices heretofore commonly employed.

Another object of my invention is to provide an antiskid device of such form that it can be applied without jacking up the vehicle wheel and without the necessity of the operator reaching behind the wheel in order to effect a connection.

Still another object of my invention is to provide an antiskid device which has tractive elements of such form that they will be more effective in mud or soft dirt than are tire chains, and which, nevertheless, can satisfactorily be used on paved highways.

Figure 1:
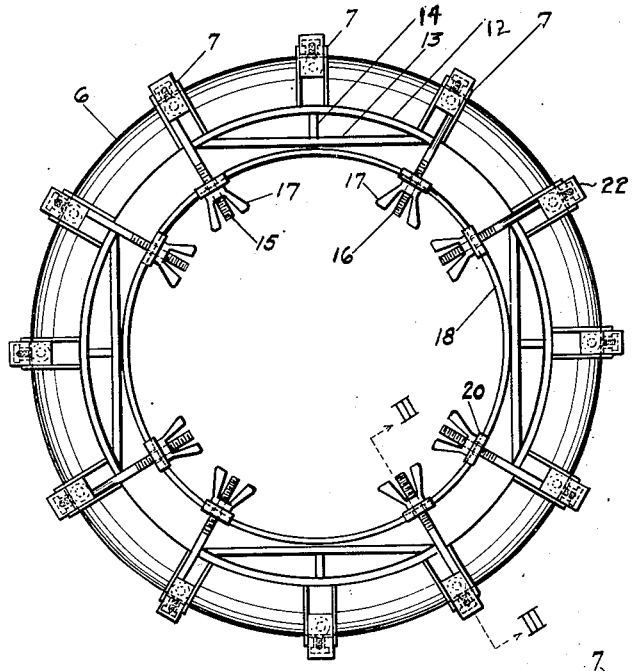
Figure 4:
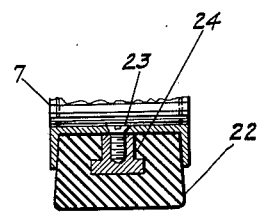
Figure 3:
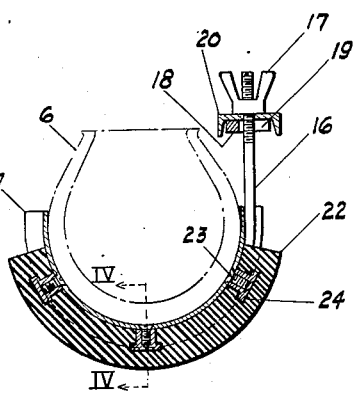
Figure 2:
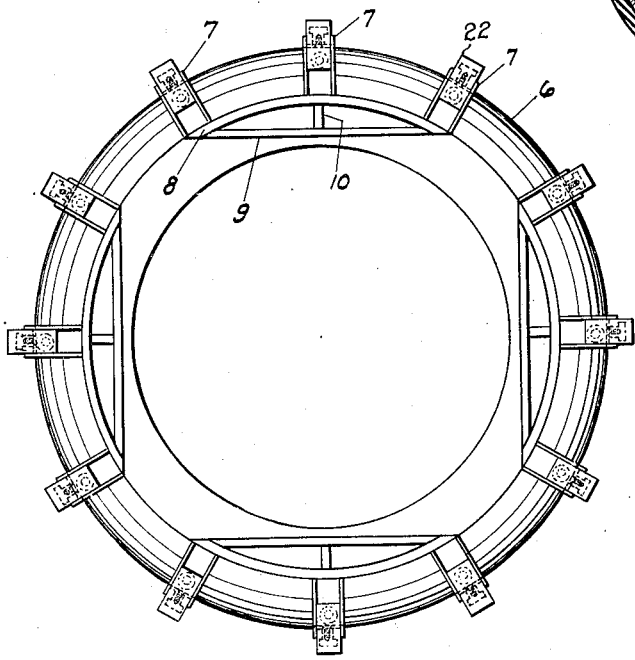

One form which my invention may take is shown in the accompanying drawing wherein Figure 1 is an outer side view of a vehicle wheel with my device applied thereto; Fig. 2 is an inside or rear view thereof; Fig. 3 is an enlarged view taken on the line III—III of Fig. 1, and Fig. 4 is a view taken on the line IV—IV of Fig. 3.

The antiskid device is shown as applied to a vehicle tire 6 of any conventional form, and comprises four antiskid units each having three metallic channel bars 7 which are of curved form and lie crosswise of the tire. An arcuate bar or rod 8 is welded to the inner ends of each group of cross bars 7, a truss bar 9 is welded to the ends of the bar 8, and a strut 10 is welded to the members 8 and 9. The members 8, 9 and 10 thus form a connection of very great strength for the inner ends of the cross bars 7. The bars 12, 13 and 14 are similarly welded together and to the outer ends of the members 7. Bolt members 15 and 16 are welded to the outer ends of two of the members 7 of each unit and are threaded for the reception of wing nuts 17.

A metal ring 18 is provided adjacent to the outer ends of the antiskid units and has slots 19 formed therein for receiving the bolts 16. A clip 20 of channel form in cross section is provided for each of the bolts 16, and each clip embraces the ring so that when the wing nuts 17 are screwed down, the anti-skid units and the ring 18 will be locked together. The ring may be sufficiently heavy or thick that it will not flex under normal stresses, or may be of spring steel, if less rigidity is desired in the antiskid assembly.

Resilient blocks or pads 22 of rubber or other suitable material are connected to the cross members 7 by screws 23 that have threaded engagement with members 24 which will be embedded or molded in the rubber blocks during the forming thereof. The screws 23 extend through the inner walls of the cross members 7 and into the inserts 24, whereby the rubber tread members 22 can readily be applied or replaced when they become worn. When the vehicle is to be driven in soft dirt, the rubber shoes 22 can be dispensed with, but they will ordinarily be employed when the vehicle is to be driven over hard-surfaced roads. The antiskid assembly is adjustable, to fit tires of various diameters.

It will be apparent that the antiskid units can be placed upon the tire from the outer side thereof, it being necessary only to hook them over the tire. Ordinarily the uppermost unit will first be applied and the ring connected thereto, whereupon the other units can be successively put into place and connected to the ring 18. If the car is not jacked up, the three uppermost units are applied, whereupon the vehicle can be moved to bring the wheel into position to permit the fourth antiskid unit to be applied thereto. The nuts 17 will ordinarily be drawn rather tightly, but sufficient looseness of fit can be provided to permit slight creeping of the units on the tire. The ring 18 affords a rigid connection for the units, and therefore not only facilitates placing them on the tire in evenly-spaced relation, but prevents excessive tilting and deflection thereof under tractive and centrifugal forces.

When it is desired to use the antiskid device only temporarily, as when pulling out of a mud hole or other soft spot, it will not always be essential to apply all four units. For example, the right and left-hand units of Figs. 1 and 2 could be applied to the ring 18, and the nuts 17 drawn down sufficiently to provide for sufficient tractive force for effecting movement of the vehicle. The ring 18 will preferably be made of sufficient strength to withstand such forces.

I claim as my invention:

1. An antiskid device comprising traction elements of generally U-form, for partially embracing a tire and arranged in groups each composed of a plurality of elements, a bar of arcuate form rigidly connecting the adjacent rear ends of the elements of each group, independently of the other groups, a bar forming a chord that is rigidly connected to the ends of the arcuate bar, and means rigidly and detachably connecting the outer ends of said groups, for holding them upon a wheel.

2. An antiskid device comprising traction elements of generally U-form, for partially embracing a tire and arranged in groups each composed of a plurality of elements, bars of arcuate form rigidly connecting the inner ends and the outer ends, respectively, of each group, independently of the other groups, bars forming chords rigidly connected to the ends of the arcuate bars in each group, a retaining ring adapted to be placed at the outer side of a wheel, and means for detachably connecting the ring to the outer ends of the groups.

3. An antiskid device comprising traction elements of generally U-form, for partially embracing a tire and arranged in groups each composed of a plurality of elements, a bar of arcuate form rigidly connecting the adjacent ends of the elements of each group, at one side of the tire and independently of the other groups, a bar forming a chord that is rigidly connected to the ends of the arcuate bar, and means rigidly and detachably connecting the outer ends of said groups, for holding them upon a wheel.

GILBERT CONWAY.